United States Patent [19]

Chiappetti

[11] 4,324,203

[45] Apr. 13, 1982

[54] ANIMAL FEEDING APPARATUS

[75] Inventor: Arthur B. Chiappetti, Chicago, Ill.

[73] Assignee: Bernard L. Kleinke, Palatine, Ill. ; a part interest

[21] Appl. No.: 118,163

[22] Filed: Feb. 4, 1980

[51] Int. Cl.³ .......................... A01K 5/02; G01F 11/00
[52] U.S. Cl. ............................... 119/51.11; 222/264; 222/305
[58] Field of Search .......... 119/51 R, 51.11; 222/264, 304, 305, 370

[56] References Cited

U.S. PATENT DOCUMENTS

| | | | |
|---|---|---|---|
| 1,226,108 | 5/1917 | Olney | 222/305 X |
| 2,552,413 | 5/1951 | Emerson | 222/370 |
| 2,785,831 | 3/1957 | Smolin | 222/305 X |
| 2,793,791 | 5/1957 | Clark | 119/56 R X |
| 3,279,434 | 10/1966 | Evans | 119/56 R |
| 3,528,588 | 9/1970 | Moore | 119/51 R X |
| 3,688,744 | 9/1972 | Kaplan | 119/51.11 |
| 4,055,146 | 10/1977 | Smrt | 119/51.11 |

Primary Examiner—Gene Mancene
Assistant Examiner—Robert P. Swiatek
Attorney, Agent, or Firm—Bernard L. Kleinke

[57] ABSTRACT

An animal feeding apparatus has a housing for confining animal food items, such as flake-type fish food, and a mechanism for dispensing the food items from the housing for feeding purposes. The housing has an opening therein communicating with the interior of the housing, and the mechanism has a rotatably mounted member disposed partially within the housing and extending outwardly through the opening. The member has one or more receptacles therein for receiving food items from the interior of the housing, and a motive device, such as a motor, rotates the member about its axis to carry food items in the receptacle from within the housing outwardly through the opening for feeding purposes. The motive device rotates the member periodically, such as once in twenty-four hours, to perform a feeding operation one or more times during each such interval of time.

3 Claims, 4 Drawing Figures

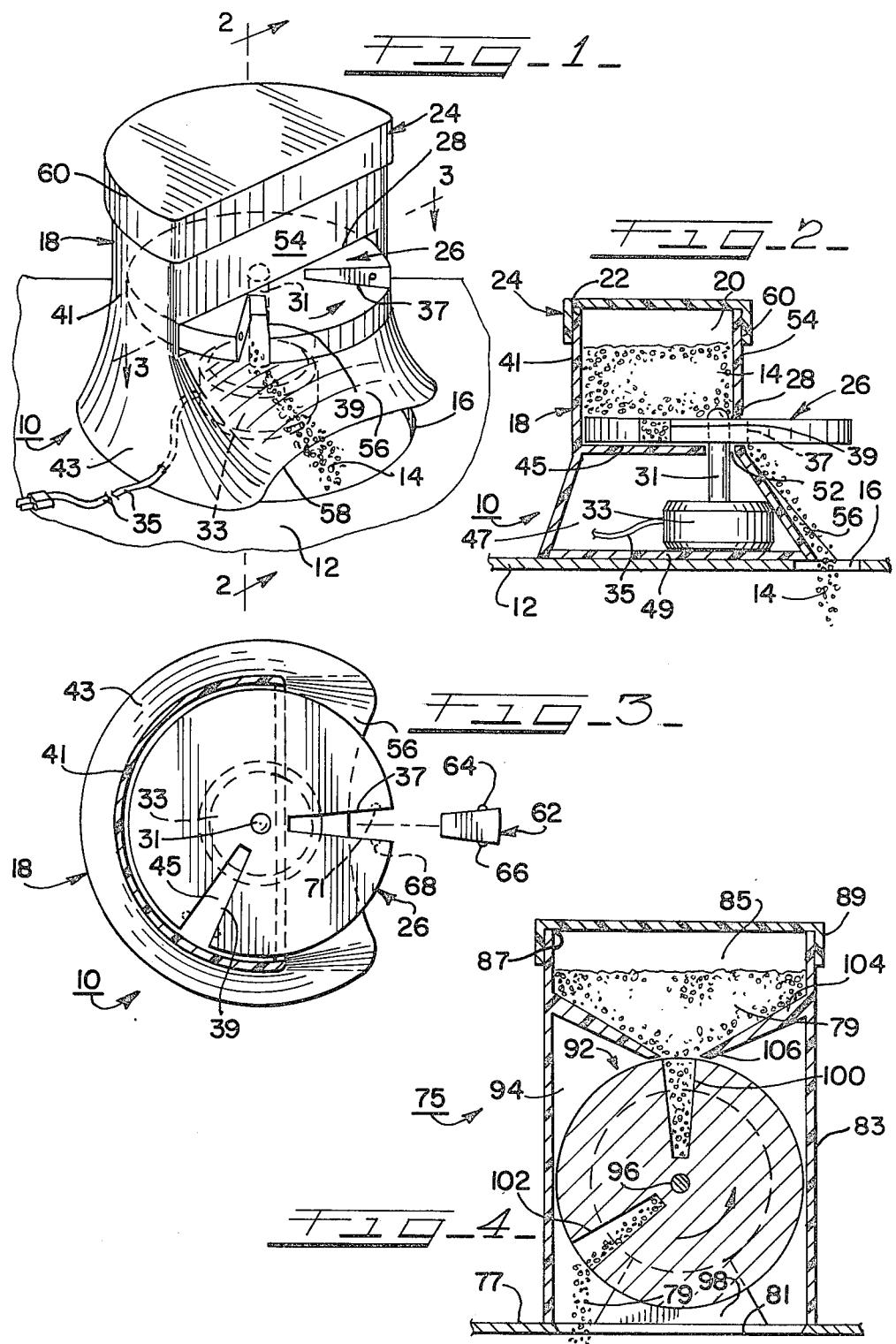

ANIMAL FEEDING APPARATUS

TECHNICAL FIELD

The present invention relates in general to an animal feeding apparatus, and more particularly relates to a device for dispensing automatically food to animals, such as fish swimming in an aquarium, at periodic intervals of time.

BACKGROUND ART

Many different types and kinds of animal feeding devices have been known in the prior art. For example, reference may be made to the following U.S. Pat. Nos. 2,865,447; 3,050,029; 3,717,125; 3,762,373 and 4,027,627. The foregoing-mentioned patents disclose different types and kinds of automatic animal feeders; however, none of them includes a relatively simple and inexpensive operating mechanism to provide reliable and dependable operation. Additionally, it would be highly desirable to have an animal feeding apparatus which is not only simple and reliable in design, but also stores a large supply of pet food, such as flake-type fish food, so that the unit can operate for long periods of time without requiring refilling.

DISCLOSURE OF THE INVENTION

Therefore, the principal object of the present invention is to provide a new and improved animal feeding apparatus, which is relatively simple and inexpensive in design, and which is capable of storing and dispensing large quantities of animal comestible items.

Briefly, the above and further objects of the present invention are realized by providing an animal feeding apparatus which has a housing for confining animal food items, such as flake-type fish food, and a mechanism for dispensing the food items from the housing for feeding purposes. The housing has an opening therein communicating with the interior of the housing, and the mechanism has a rotatably mounted member disposed partially within the housing and extending outwardly through the opening. The member has one or more receptacles therein for receiving food items from the interior of the housing, and a motive device, such as a motor, rotates the member about its axis to carry food items in the receptacle from within the housing outwardly through the opening for feeding purposes. The motive device rotates the member periodically, such as once in twenty-four hours, to perform a feeding operation one or more times during each such interval of time.

BRIEF DESCRIPTION OF DRAWINGS

The above-mentioned and other objects and features of this invention and the manner of attaining them will become apparent, and the invention itself will be best understood by reference to the following description of embodiments of the invention taken in conjunction with the accompanying drawings, wherein:

FIG. 1 is a pictorial view of an animal feeding apparatus which is constructed in accordance with the present invention and which is shown resting on top of an aquarium hood shown fragmentarily for illustration purposes;

FIG. 2 is a vertical cross-sectional view in a reduced scale of the apparatus of FIG. 1;

FIG. 3 is a cross-sectional plan view of the apparatus of FIG. 1; and

FIG. 4 is a vertical cross-sectional elevational view of another animal feeding apparatus, which is constructed in accordance with the present invention, and which is shown resting on top of an aquarium hood.

BEST MODE OF CARRYING OUT THE INVENTION

Referring now to the drawings, and more particularly to FIGS. 1, 2 and 3 thereof, there is shown an animal feeding apparatus 10 which is constructed in accordance with the present invention, and which is shown resting on top of an aquarium hood 12 covering the top of an aquarium (not shown) for storing and dispensing animal food items 14, such as flake-type fish food, by dropping it through an opening 16 in the hood 12. The apparatus 10 includes a generally cylindrical-shaped housing 18 having, as best seen in FIG. 2, an interior upper compartment 20 for storing a quantity of the food items 14. The compartment 20 is sufficiently large in capacity to store several months' supply of the fish food items. The compartment 20 has an open top mouth 22 which is closed over by a cover 24, which may be composed of transparent plastic material to easily view the interior of the compartment 20 to determine when it requires refilling.

A generally circular disc member 26 is mounted within the interior of the compartment 20 and extends through an opening 28 in the front of the housing 18. The disc member 26 is mounted for rotation about its axis, which is parallel to and is displaced off-center relative to the vertical axis of the housing 18 near the opening 28 therein. An output shaft 31 of a motor 33 is fixed to the disc member 26 at the central vertical axis thereof for driving the member 26 rotatably and has a line cord 35 extending out of the housing 18 for connection to a source (not shown) of electrical current for driving the motor 33. A plurality of similar angularly-spaced receptacles 37 and 39 are formed in the disc member 26 to receive a quantity of the fish food items 14 to carry them outwardly through the opening 28 in the housing 18 to drop them sequentially through the opening 28 and into the aquarium for feeding purposes. The motor 33 rotates its output shaft 31 slowly through a given revolution to determine the frequency of feeding the fish. In the preferred form of the invention, the motor 33 rotates its shaft 31 at the rate of once each 24-hour period so that with two receptacles 37 and 39, the fish are fed twice a day. It will become apparent to those skilled in the art that a greater or lesser number of receptacles may be provided depending upon the desired number of feedings desired in each 24-hour period.

Considering now the housing 18 in greater detail with reference to the drawings, the housing 18 is generally cylindrical in shape and is hollow in construction. The housing 18 includes an upper body portion 41 having a hollow tapered base portion 43. The body portion 41 includes the upper compartment 20 and is generally D-shaped or semi-circular in cross section. As shown in FIGS. 2 and 3 of the drawings, an intermediate internal wall 45 separates the upper compartment 20 from a lower compartment 47 in the base portion 43 confining the motor 33. As shown in FIG. 2 of the drawings, a bottom wall 49 closes over the bottom portion of the base portion 43, and the motor 33 rests thereon within the compartment 47. An opening 52 in the intermediate wall 45 receives the output shaft 31 which extends upwardly therethrough into the upper compartment 20 and is fixedly connected at its upper end to the central portion of the circular disc member 26.

As shown in FIG. 1 of the drawings, a front face 54 of the upper body portion 41 has the elongated rectangularly-shaped horizontal opening 28 extending therethrough to permit the disc member 26 to project outwardly therethrough. The disc member 26 fits within the opening 28 in a closely spaced manner, and yet permits free rotation of the member 26 relative to the housing 18. A dished portion 56 is formed in the front portion of the flared base portion 43 to serve as a guide for the food items falling from the receptacles, such as the receptacle 39 as shown in FIG. 1 of the drawings, whereby the falling food items slide therealong and into and through the opening 16 in the aquarium hood 12. The dished portion 56 serves as a channel or a guide which has a curved bottom edge 58 positioned over the hole 16. It should be noted that the front portion of the flared base 43 is flared outwardly to a greater extent than the back portion of the flared base portion so as to accommodate the motor 33 disposed within the compartment 47 in an off-center position relative to the upper body portion 41.

As best seen in FIG. 2 of the drawing, the cover 24 is generally D-shaped or semi-circular to fit over the upper body portion 41 to close the open top mouth 22. The cover 24 fits loosely thereover but is sufficiently tight fitting to seal-in odors coming from the food items 24. The cover 24 includes a depending flange 60.

Referring now to FIG. 3 of the drawings, in order to enable different quantities or portions of feedings to be dispensed to the fish, each receptacle, such as the receptacle 37, is an open notch or slot extending radially from the outer periphery of the disc member 26 toward the center thereof, and a complementary-shaped plug member 62 may be snapped into the receptacle 37 to reduce its size, thereby reducing the quantity of fish food items received therein when the receptacle 37 rotates into the feed compartment 20. The plug member 62 is a wedge-shaped block of a similar shape as the opening 37 to enable the plug member 62 to be inserted partially therein. When inserted into the receptacle 37, the plug member 62 extends from the periphery of the disc member 26 toward and spaced from the center thereof. The plug member 62 has a pair of outwardly extending male snap abutments 64 and 66 which are adapted to snap into engagement with a pair of oppositely-disposed internal complementary-shaped openings or recesses 68 and 71, respectively, in the disc member 26 opening into the receptacle 37. It will become apparent to those skilled in the art that a similar such plug member 62 may be inserted into the receptacle opening 39, and also the plug member 62 may be of different sizes to determine the quantity of the fish food being dispensed from the apparatus 10.

In use, the cover 24 is first removed to permit the upper compartment 20 to be filled with the food items 14, and then the cover is replaced and the line cord 35 is connected to a suitable source of electrical power to start the member 26 rotating at a rate of speed of one revolution in 24 hours. During each such revolution, for example, the receptacle 37 moves within the compartment 20 so that the food items fall therein and are carried thereby until they are pushed out of the opening 28. The items 14 then fall out of the bottom of the receptacle 37 and along the dished portion 56 into the hood opening 16. The receptacle 37 then continues to move rotatably therefrom and eventually through the housing opening 28 and into the interior of the compartment 20 to repeat the cycle of operation.

Referring now to FIG. 4 of the drawings, there is shown an animal feeding apparatus 75, which is constructed in accordance with the present invention, and which is shown resting on top of an aquarium hood 77 covering the top of an aquarium (not shown) for storing and dispensing animal food items 79, such as flake-type fish food by dropping it through an opening 81 in the hood 77.

The apparatus 75 includes a generally cylindrical shaped housing 83 for storing a quantity of the food items 79 in an interior upper compartment 85. The compartment 85 has an opened top mouth 87 which is closed over by a cover 89 which is generally similar in construction to the cover 24 of FIG. 1 of the drawings.

A generally cylindrical-shaped drum 92 is mounted for rotation within the interior of a bottom compartment 94, the drum 92 being rotatable about a horizontal axis by means of an output shaft 96 of an electrical motor 98. A series of angularly spaced-apart receptacles 100 and 102 extend radially within the drum 92 from the outer periphery therein to a point near the central horizontal axis of the drum 92. The axial length (not shown) of the receptacles is determined by the quantity of food items to be dispensed. It should be understood that plug members (not shown) may also be employed to close off a predetermined portion of the receptacle openings in a similar manner as the plug member 62 of FIG. 3 of the drawings is used to close off partially the receptacle opening 37.

A funnel-shaped interior wall 104 divides the upper feed compartment 85 from the lower motor compartment 94 and has a central opening 106 through which the food items 79 contained in the upper compartment 85 drop into the receptacles as they rotate therepast. The motor 98 rotates its output shaft 96 a predetermined speed, such as one revolution in 24 hours in a similar manner as the motor 33 of FIG. 1 of the drawings so that, by employing two receptacles 100 and 102, the apparatus 75 dispenses the food items twice during a 24-hour period of time.

While particular embodiments of the present invention have been disclosed, it is to be understood that various different modifications are possible and are contemplated within the true spirit and scope of the appended claims. For example, different types and kinds of materials, such as plastic, metal or the like may be employed in connection with the various portions of the housing and rotatable members. There is no intention, therefore, of limitations to the exact abract or disclosure herein presented.

What is claimed is:

1. In an animal feeding apparatus having means defining a storage compartment in a housing for confining animal food items and having a mechanism for dispensing the food items from the storage compartment for feeding purposes, an arrangement comprising:

said means defining a compartment having a wall transverse to the vertical axis thereof, the housing having a front face, said front face having means defining an opening disposed above the wall communicating with the interior of the storage compartment, the mechanism having a rotatably mounted member being disposed partially within the storage compartment and extending outwardly from the interior of said storage compartment through said opening, said member having at least one receptacle therein for receiving food items from the compartment, motive means drivingly connected to said member for rotating it about its axis to push food items carried in said receptacle from within said compartment outwardly through said opening for feeding purposes; said rotatably mounted member being a disc member, the vertical central axis of the disc member about which it rotates being disposed near said opening; said receptacle being an open notch therein for receiving food items falling therein within the compartment;

said member including a second receptacle spaced angularly from the first-mentioned receptacle, the receptacles being wedge-shaped open notches;

said motive means including an output shaft turning at the rate of one revolution per twenty-four hours;

said motive means being an electric motor;

said disc member being generally horizontally disposed and being generally circular in shape, said compartment being generally cylindrical and semi-circular in cross section throughout the axial length thereof; and said housing having an outwardly flared hollow base portion surrounding said motor, said base portion having a front inwardly smoothly-contoured external dished portion disposed below and depending from said opening in said housing for guiding the stream of food items falling from said receptacles therein.

2. In an animal feeding apparatus, the arrangement according to claim 1, further including plug means for closing partially said receptacles to cause them to have correspondingly smaller capacities, thereby reducing the quantity of the food items entering and leaving said receptacles.

3. In an animal feeding apparatus, the arrangement according to claim 2, wherein said plug means comprise wedge-shaped blocks for filling partially said notches.

* * * * *